No. 884,632. PATENTED APR. 14, 1908.
J. R. BLAKE.
MINER'S CANDLESTICK.
APPLICATION FILED DEC. 13, 1907.
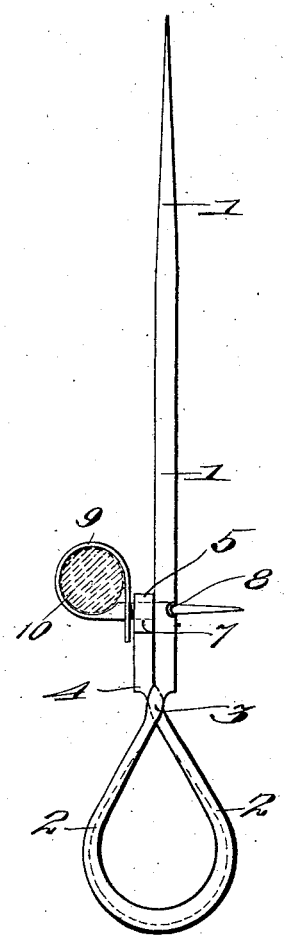
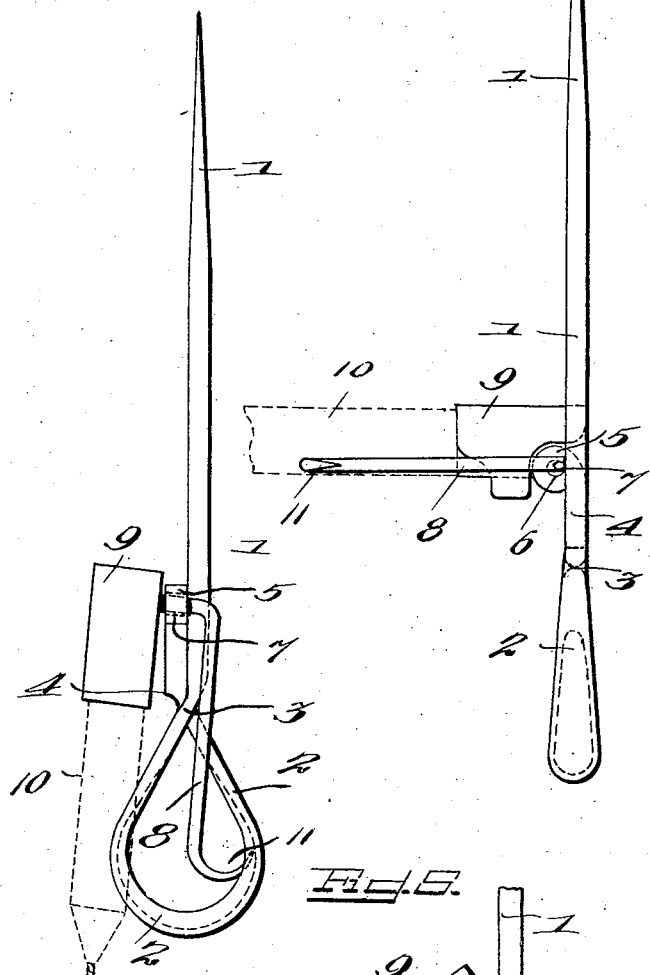
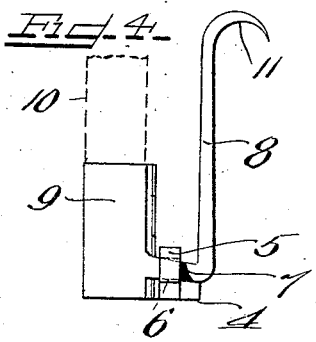
Witnesses:
C. S. Ashley
T. W. Ashley
Inventor
James R. Blake
By his Attorneys

UNITED STATES PATENT OFFICE.

JAMES R. BLAKE, OF BISBEE, ARIZONA TERRITORY.

MINER'S CANDLESTICK.

No. 884,632.  Specification of Letters Patent.  Patented April 14, 1908.

Application filed December 13, 1907. Serial No. 406,264.

*To all whom it may concern:*

Be it known that I, JAMES R. BLAKE, a citizen of the United States, residing at Bisbee, in the county of Cochise and Territory of Arizona, have invented certain new and useful Improvements in Miners' Candlesticks, of which the following is a specification.

The invention relates to improvements in miners' candlesticks.

The object of the invention is the providing of means whereby the candle-holder and suspending hook may be thrown back on or closed and locked in a position substantially parallel to the shank or impaling iron, thus rendering it possible to fold the candlestick so as to be readily carried in the pocket of the user.

In the following is described in connection with the accompanying drawings one embodiment of the invention, the features thereof being more particularly described hereinafter in the claims.

Figure 1 is a plan view of the device. Fig. 2 is a side elevation of the device showing the candle-holder and suspending hook in their open and operative positions. Fig. 3 is a plan view of the device showing the candle-holder and suspending hook in a closed and locked position. Fig. 4 is a detail view of the candle-holder and suspending hook, and Fig. 5 is a detail view of the candle-holder and suspending hook illustrating the same partly open.

Similar numerals of reference indicate similar parts throughout the several views.

1 indicates the shank or impaling iron of the candlestick preferably tapering to a point and square in cross section and having formed thereon a handle 2, the return end of which passes preferably under shank 1, as at 3, to form a spring end 4. The upper end of spring 4 is enlarged as at 5 to form a suitable bearing for the shank 7 of suspending hook 8. The bearing surface 6 formed in bearing 5 is preferably round and shank 7 is preferably square in cross section in order to coöperate therewith in holding the flat side of shank 7 against a correspondingly flat side of impaling iron 1, spring 4 being stiff enough to hold the parts firmly in any position and either open or closed. Shank 7 is preferably turned at such an angle to hook 8 and candle-holder 9 as to cause the hook point 11 of hook 8 to fall within handle 2 when the candlestick is in folded or closed position, the candle-holder and hook extending in the same direction from shank 7 and substantially parallel. Candle-holder 9 is suitably supported on the end of shaft 7 or it may be integral therewith and is adapted to accommodate a candle 10.

When the candlestick is in open or operative position the candle 10 and hook 8 are substantially perpendicular with reference to impaling iron 1 so that the candle will be in substantially a vertical position, for example, if hook point 11 is caught on a rough surface, or impaling iron 1 is stuck into a suitable crevice or timber.

When the candlestick is in its folded position with hook point 11 within handle 2 it can be readily placed in the pocket or otherwise carried without danger of catching in anything. This permits making the hook of sufficient length to hang well without adding to its inconvenience when not in use.

By the term "candle" I mean to include as well other lighting means such as a lamp or electric light, and the terms "candle-holder" and "candlestick" are intended to include as well means for holding such other lighting means.

It is obvious that the details of construction as herein described may be varied without departing from the spirit of the invention.

What I claim and desire to secure by Letters Patent is:—

1. A candlestick comprising an impaling iron, a handle and spring integral therewith, a bearing in said spring, a suspending hook, a candle-holder and a shank connecting said hook and holder and rotatable in said bearing.

2. A candlestick comprising an impaling iron, a handle, a spring, a suspending hook, a candle-holder, a shank connecting said hook and holder and inclined towards each of them and having a bearing in said spring to permit said hook to be folded into said handle.

3. A candlestick comprising an impaling iron, a handle integral therewith and turned up thereunder so that its end is adapted to form a spring, a suspending hook, a candle-holder, a shank connecting said hook and holder, a bearing in said spring for said shank and means permitting said shank to turn in said bearing whereby the hook may be folded into the handle and the holder substantially parallel therewith.

In testimony whereof I have hereunto signed my name in the presence of two subscribing witnesses.

JAMES R. BLAKE.

Witnesses:
FRED. P. DE WILDE,
F. A. BLAKE.